Oct. 22, 1963  A. W. GERRANS  3,107,800
APPARATUS FOR HANDLING FRUIT-CARRYING TRAYS AND THE FRUIT
Filed May 20, 1957  5 Sheets-Sheet 3

INVENTOR.
ALFRED W. GERRANS
BY
Paul B. Fihe
PATENT AGENT

United States Patent Office 3,107,800
Patented Oct. 22, 1963

3,107,800
APPARATUS FOR HANDLING FRUIT-CARRYING
TRAYS AND THE FRUIT
Alfred W. Gerrans, 1744 Valpico Drive,
San Jose, Calif.
Filed May 20, 1957, Ser. No. 660,374
1 Claim. (Cl. 214—305)

The present invention relates generally to the art of article handling and more particularly to apparatus for handling fruit-carrying trays and the fruit, such as prunes or apricots, carried thereby.

Fruit handling operations involve a number of successive steps, among which the following are directly pertinent to the present invention. The fruit, for example, prunes, are placed in a single layer on relatively large flat trays to enable drying thereof. These trays are composed of a number of thin fruit-supporting slats that are held in adjoining coplanar relation by thicker, parallel ribs that project an equal distance above and below the slats wherefore the opposite surfaces of the trays are of identical configuration, and either surface can be used to support the fruit. Since the ribs project above and below the plane of the slats, the trays can be stacked with such ribs in engagement wherefore the prunes remain free from pressure and can be exposed to hot dry air for dehydration. Generally, the trays, laden with the fruit, are stacked in the above described manner on a flat cart so that the entire stack can be stored in a minimum of space yet can be brought to a desired location quickly when required.

In some instances, the stacks must be broken down and the fruit is dumped from each tray. For example, dried fruit is so dumped preparatory to storage. On the other hand, green fruit is spread in a single layer on empty trays and the trays are stacked for conveyance to a dehydrator or for temporary storage. An exemplary operation of this latter type is carried out in part with the apparatus described in Patent No. 2,133,442 issued to William L. Gerrans for a "Tray Loading Apparatus." While this specific apparatus does automatically spread the fruit on a tray, the operations of unstacking the trays, dumping or unloading of the fruit from each tray, and the stacking of the loaded trays are all accomplished manually. Since such manual operations are time consuming, they limit the rate of tray handling so that the full capacity of the apparatus cannot be realized.

Accordingly, it is a general object of the present invention to provide apparatus for handling fruit trays and the fruit thereon autmatically wherefore rapidity of such handling is enabled and full advantage of conjoined equipment, such as the tray loading apparatus mentioned above, can be realized.

While the tray loading apparatus has been mentioned and the present invention will be explicated in conjunction therewith, it is a feature of the present invention to provide tray and fruit handling apparatus that is readily applied to various installations.

More particularly, it is a feature of the invention to provide for the quick, successive removal of trays from a stack so that each tray follows an accurately predetermined path even through certain misalignments may have existed in the stack itself.

An additional feature relates to the control of the removal of the trays from the stack which renders the mechanism operative only so long as a stack of trays, large or small, is presented thereto.

A further feature relates to the elevation of the stack preparatory to the removal of the uppermost tray therefrom which elevation is performed in a controlled manner so that each tray is disposed successively in substantially the same position for its individual removal from the stack.

An additional feature relating to the unstacking of the trays is the effective prevention of the removal of more than one tray from the stack at a time.

Another feature relates to the inversion of the tray after it has been separated from the stack whereby unstacking of the trays and the dumping of the fruit therefrom is accomplished by a unitary, coordinated mechanism.

With reference to the dumping of the fruit, it is a feature to provide for the variation in speed of the trays whereby successive trays are separated while the dumping from the succeeding tray is accomplished, but again come into abutting relation prior to the subsequent loading of the trays with fruit.

Another feature relating to the controlled advance of the trays provides for the acceleration of each tray after once loaded to thereby enable an accurate stacking thereof.

The arrangement for accomplishing such accurate stacking constitutes another broadly-stated feature of the invention.

More particularly, a feature relates to the elevator mechanism of the stacking mechanism whose descent as trays are stacked is correlated with the ascending elevator of the unstacking mechanism previously referred to.

An additional feature of the stacking mechanism relates to its manner of receiving the trays whereby small variances in position or speed of the trays is accommodated and a regular, aligned stack is formed.

Other objects and features of the invention, as well as those specifically delineated above, will become more apparent from a perusal of the following description of the accompanying drawings wherein:

FIG. 5 is a horizontal sectional view taken along line 5—5 of FIG. 4, and illustrating details of construction of an arrangement for supporting and elevating a stack of trays so that the uppermost tray of the stack can be brought into position for individual removal from the stack.

Figure 1:
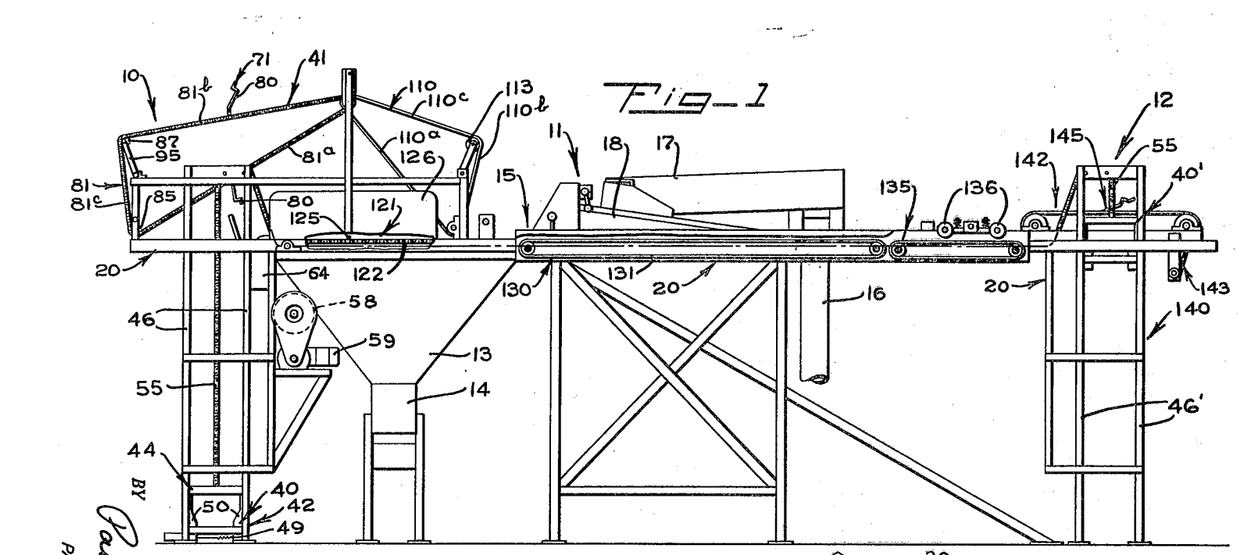
FIG. 1 is a side elevational view with portions broken away of an apparatus for handling trays and fruit carried thereby, which apparatus constitutes a preferred embodiment of the invention.

With initial reference to FIG. 1, the preferred embodiment of the invention can somewhat arbitrarily for purposes of its explication be divided into three sections; first, a tray unstacker and dumper, generally indicated at 10; a tray loader 11; and a tray stacker 12. After a stack of trays has been brought from the left of the apparatus, as viewed in FIG. 1, such stack of trays is elevated in a controlled manner wherefore successive individual trays can be removed from the top of the stack and inverted so that the fruit thereon will be dumped into a hopper 13. The hopper 13 discharges the fruit into a conduit 14 wherein it is carried on a belt (not shown) to a storage station while the trays are moved successively to the tray loader 11 and stacker 12 by conveyor means, generally indicated at 15. Green fruit is brought through a conduit 16 to a feeding device 17 which in turn deposits the fruit upon a shaker table 18 that delivers the fruit in a single layer onto the trays conveyed thereunder along a horizontal path defined by the conveyor means 15. After such loading of the trays, they continue along the horizontal path to the aforementioned tray stacker 12; and after a stack has been formed thereby, such stack is removed from the apparatus to a desired location.

The entire structure, as generally described above including the three sections 10, 11, and 12, is supported on a unitary, rigid frame 20 which, preferably consists of suitable upright, longitudinal, and transverse frame members welded together to hold the various sections in their proper, relative, positions, and also to provide for the accommodation of a stack of trays six feet or more in height.

Figure 2:
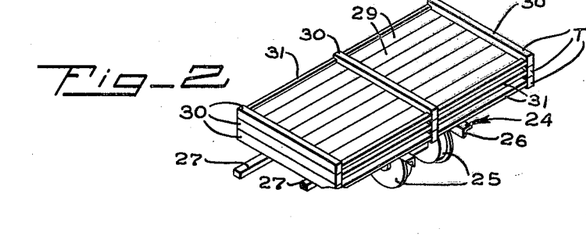
FIG. 2 is a perspective view of a small stack of trays on a cart for presentation to the apparatus of FIG. 1.

For presentation to the apparatus, the trays T are stacked conventionally, as shown in FIG. 2, upon a flat cart 24. Such cart 24 consists of four small wheels 25 supporting a frame 26 that includes a pair of transverse frame members 27 which are sufficiently long to underlie and support the tray stack with the lowermost tray approximately one-half foot above the ground or other supporting surface, and aligned lengthwise with the transverse frame members 27, 28. As previously mentioned, each tray T consists of a large number of thin, fruit supporting slats 29 that are held in adjoining, coplanar relation by four relatively thick parallel ribs 30 which are secured to the slats 29 both at intermediate positions and at the respective ends thereof. These thick ribs 30 come into engagement when the trays are stacked and leave sufficient space between the fruit-supporting slats 29 to enable the accommodation of a layer of fruit thereon and the passage of dry air thereover. Additionally, to confine the layer of fruit to the slats 29, other ribs 31 are secured to the ends of the described supporting ribs 30 so that, in effect, a low wall is formed about the entire periphery of the tray T. This type of tray is that conventionally employed in the fruit-handling industry, and the embodiment of the invention herein disclosed has been specifically designed for this industry and therefore to handle this type of tray and the fruit carried thereby. However, it is to be definitely understood that the principles of the invention can be embodied in other structures of a slightly modified nature so that trays or other articles of deviant structure can be handled.

*Tray Unstacker and Dumper 10*

Figure 3:
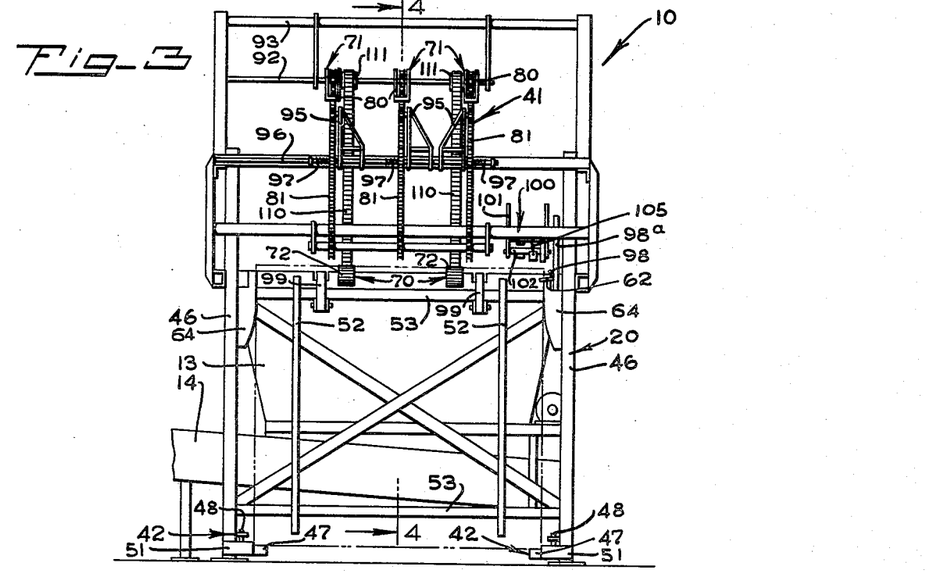
FIG. 3 is an end elevation of the structure as viewed from the left in FIG. 1 and illustrating in particular that portion of the apparatus whereat the fruit trays are individually and successively removed from a stack, and the fruit is dumped there from, FIG. 4 is a sectional view taken along line 4—4 of FIG. 3.
Figures 4, 5:
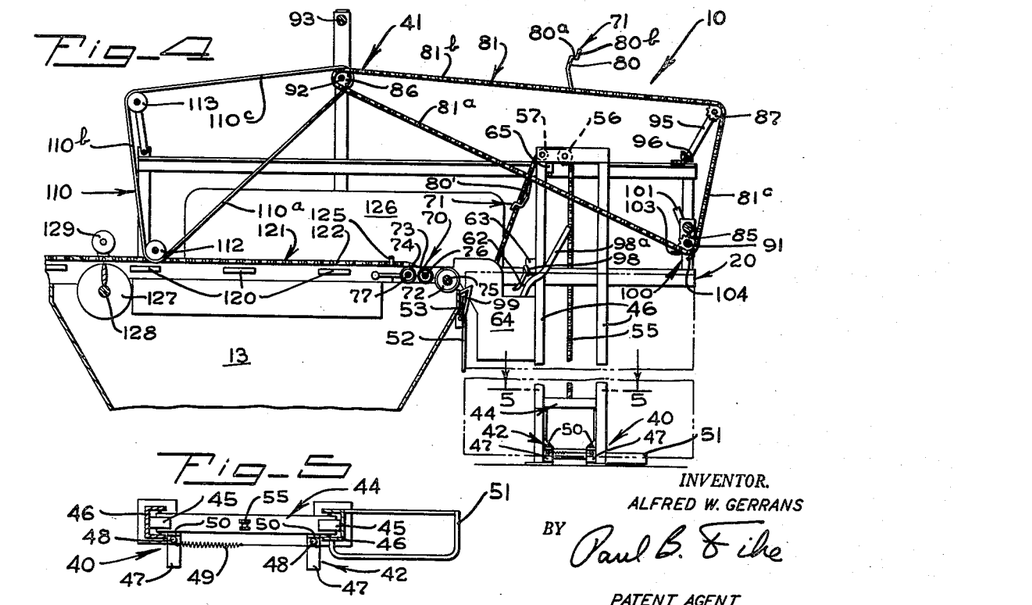

Trays T stacked on a cart 24 in the manner shown in FIG. 2 are brought to the left end of the machine, as shown in FIG. 1, for initial presentation to the tray unstacker and dumper 10 whose structure can best be visualized by reference to FIGS. 3, 4 and 5 in conjunction with FIG. 1.

The tray unstacker and dumper 10 includes an elevator, generally indicated at 40, that is arranged to receive the trays T from the cart 24 and to successively present the uppermost tray on the stack to a tray-inverting mechanism 41 which ultimately effects the dumping of the fruit from each tray into the described hopper 13.

The elevator 40 includes a pair of carriages 42 mounted for vertical movement at each side of the apparatus frame 20, the frame members being sufficiently spaced so that a stack of trays can be accommodated therebetween, as shown by the phantom lines in FIG. 3. Each of the carriages 42 consists of a rectangular frame 44 which mounts two rollers 45 on each of its opposite sides. The carriage 42 is received between two parallel vertical U-channel members 46 which constitute a portion of the apparatus frame 20; and the rollers 45 of the carriage engage the base portions of these U-channels 46 (see FIG. 5) wherefore the entire carriage can partake of the aforementioned vertical movement. To provide support for the tray stack, a pair of arms 47 are arranged to project inwardly from the lower portion of the carriage 42. Each arm 47 is pivotally supported on a vertical pin 48 carried by the carriage so that both arms can swing in substantially a horizontal plane. As best shown in FIG. 5, a coil spring 49 is connected between the pivoted arms 47 on opposite sides of their pivotal axes so that the spring urges both of the arms in the same rotative direction, counterclockwise, as viewed in FIG. 5. Each arm 47 is provided with an associated stop 50 against which the arm is urged by the described spring 49, and this stop is so located that the arm is normally maintained in an inwardly directed position. When the carriage is in its lowermost position, as illustrated in FIGS. 3 and 4, the inwardly projecting arms 47 are disposed at a level beneath that of a tray stack on an approaching cart 24. As a cart 24 is pushed between the upright channel members 46 of the apparatus, the pivoted arms 47 are engaged by the foremost transverse frame member 27 of the cart so as to swing aside and permit continued pushing of the cart to a position between the carriages 42, as indicated in phantom lines in FIG. 4. The arms 47, having temporarily swung aside to permit the passage of the transverse frame member 27 of the cart, thereafter reassume their inwardly projecting position underneath the lowermost tray of the stack. To assure that the stack attains the desired position over the arms 47 of the elevator, curved guide plates 51 are rigidly attached to the carriage supporting channel members 46 adjacent their base and vertically disposed stop rods 52 are secured to transverse elements 53 of the apparatus frame 20. The guide plates 51 control the lateral disposition of the tray stack while the stop rods 52, in turn, determine the amount of insertion of the stack, or, in other words, its position longitudinally of the apparatus frame 20.

To effect upward movement of the carriages 42 and the arms 47 carried thereby so that the latter will first engage and thereafter lift the tray stack from its supporting cart 24, the end of a link chain 55 is connected to the upper side of each carriage. From such connection, the link chain 55 passes vertically to a small idler sprocket 56 adjacent the upper end of the U-channels 46 between which the carriage 42 is disposed, and thereafter passes around a second sprocket 57 and downwardly to a drive sprocket 58 (see FIG. 1), which is suitably connected by a series of reduction gears (not shown) to a motor 59. From the drive sprocket 58, the link chain 55 continues to the remote end of the apparatus where it is operatively connected to an elevator of the tray stacking section 12, as will be described in detail hereinafter.

Upward movement of the carriages 42, the arms 47 carried thereby, and the stack of trays resting on such arms, is instigated by the closing of a main switch (not shown) associated with the described motor 59; but thereafter such movement is periodically interrupted and again started by the opening and closing of an auxiliary control switch that is connected electrically in series with the aforementioned main switch and is normally closed. The opening and closing of this control switch is effected by the movement of a switch arm 62 which projects from the switch housing 63 mounted on one of the described U-channels 46 inwardly into the path of a rising stack of trays. To assure that each tray ascends along the same path so as to properly engage the switch arm, guide plates 64 are rigidly attached to the side of the frame in closely-confining relation to the trays. The switch arm 62 is mounted pivotally to swing substantially vertically and in its normal lower position, as illustrated in FIG. 4, the switch is closed to render the elevator 40 operative. When the uppermost tray of the rising stack pushes the switch arm 62 upwardly a predetermined amount, the switch is opened to stop upward travel of the elevator 40 and the stack of trays thereon. When the upward movement of the stack is thus discontinued, the uppermost tray is properly disposed for removal from the stack by the tray inverting mechanism 41 which has been previously mentioned, and which will be described in detail hereinafter. Once a tray has been removed from the top of the stack, the switch arm 62 is free to fall to a lower position whereat the switch is closed to again start upward movement of the elevator 40 and the trays stacked thereon. Again this upward movement is stopped when the next tray reaches the level previously attained by the tray now removed from the stack. Thus, it will be seen that an interrupted motion of the elevator 40 automatically brings successive individual trays of the stack to precisely the same position whereat the tray inverting mechanism 41 can successively remove each of the presented trays, this constituting a feed back control for the presentation of trays to the inverting mechanism 41.

A normally-closed limit switch 65 electrically in the motor circuit is physically mounted at the top of the U-channel members 46 in the path of the elevator carriage 42. Consequently, this switch 65 is only actuated after a stack of trays has been exhausted, and the still-rising carriage 42 engages this switch 65 to open the elevator motor control circuit to arrest further upward movement of the carriages.

From the foregoing, it can be seen that the elevator 40 brings each tray on the stack successively into position for subsequent removal therefrom by the tray-inverting mechanism 41. Such action, of course, continues until a given stack is completely depleted or exhausted, after which the elevator 40 automatically is stopped from further upward movement. Thereafter, the elevator 40 is returned to its lowermost position preparatory to the receipt of another stack of trays; and the entire process of elevation of the stack and removal of each successive tray lying uppermost thereon by the tray-inverting mechanism 41 is then repeated.

It may be noted that due to the guiding action of the stop rods 52 and the guide plates 64, each individual tray as it nears the uppermost position preparatory to removal by the tray-inverting mechanism attains the substantially identical transverse position. This, of course, means that each tray engages the switch arm 62 at substantially the same point so that the interruption of the rising of the tray occurs at the same level wherefore each successive tray is brought to precisely the same vertical position. The accurately positioned uppermost tray is at this point stopped so that the tray-inverting mechanism 41 can grasp each tray in turn and the subsequent inverting operation may be performed with a high degree of accuracy. This aligning of the trays so that, in effect, each tray can be handled in exactly the same manner and ultimately will follow the same, or substantially the same, path through the machine is extremely important in that it frequently occurs that slight deviations in the shape of the trays are experienced; and furthermore, that the trays themselves are, upon occasion, not stacked in precise alignment. Thus, within the apparatus itself, provision is made for correction both of deviations in the shape of the individual trays and for stacking misalignment.

While the position of the uppermost tray on the stack preparatory to its inversion is accurately controlled by the arrangement of the elevator 40 itself, the time of presentation of each tray to the tray-inverting mechanism 41 is controlled not within the elevator itself, but by the mentioned feed back control arrangement which includes the described auxiliary control switch opened and closed by switch arm 62 and which effects the presentation of each tray thereto only after its predecessor has been removed from the position of presentation to the tray-inverting mechanism 41. By this feed back control of the time of tray presentation, the accuracy of correlation of movement between the tray-inverting mechanism 41 and the elevator mechanism 40 is made less critical, as will become more apparent hereinafter as the description of the tray-inverting mechanism proceeds.

Generally, the tray-inverting mechanism 41 includes pivot means 70 that is adapted to engage one edge of the tray and tray-gripping means 71 cooperatively arranged to engage the opposite edge of the tray to urge the same against such pivot means and thereafter to move along an arcuate path centered generally at the pivot means to effect the ultimately desired inversion of the tray.

More particularly, and with continued reference to FIGS. 1, 3, and 4, the mentioned pivot means 70 preferably is composed of three pairs of rollers 72, 73, 74 supported for rotation on three parallel, adjacent shafts 75, 76, 77 that extend generally tranversely of the machine so as to support the rollers approximately adjacent the forward edge of the uppermost tray on a stack or to the left thereof as viewed in FIG. 4. Suitable mechanism of conventional nature (not shown) is connected to the three shafts 75, 76, 77 to provide simultaneous, continuous, correlated rotation thereof in a counterclockwise direction, as viewed in FIG. 4. The first roller pair 72 is driven at a lesser speed than the other roller pairs 73, 74 for a purpose to become apparent hereinafter. Preferably, each roller 72, 73, 74 is covered with a roughened, rubber surface so that frictional engagement with the edge of a tray can be provided. The two rollers on one shaft are spaced a distance which differs from the spacing of the rollers on the adjacent shaft (see FIG. 3). Such staggered relationship of the rollers 72, 73, 74 enables fruit from a tray during its inversion to fall into the described hopper 13 a portion of which lies under the rollers, as clearly shown in FIG. 4, rather than to accumulate on or between the rollers themselves.

The tray-gripping means 71 that is arranged to cooperate with the pivot means 70 described above includes three tray-gripping fingers 80 arranged to move simultaneously along substantially parallel paths so that they may engage the edge of a tray at spaced points to provide balanced support therefor. Such multiple engagement enables the handling of trays that are partially broken. Since each of the fingers 80 is of identical construction, and is carried in a similar fashion along its predetermined path, only one finger and its supporting mechanism will be described; the other fingers and their supporting mechanisms being indicated in the drawing by the same numerals. The finger 80 is carried by an endless link chain 81; one end of the finger being welded or otherwise attached to the outer side of the chain 81. The free end of the finger 80 remote from the link chain 81 is hooked as indicated at 80a to provide proper supporting engagement with the edge of a tray and a bent tail 80b terminates such hooked portion 80a.

As shown best in FIG. 4, the link chain 81 is trained about three spaced sprockets 85, 86, 87 so as to form an overall configuration of triangular nature. The first flight 81a of the chain 81 extends from the first sprocket 85, which is located closely adjacent to the edge of the uppermost tray remote from the described pivot means along an upwardly inclined path passing in spaced relation to the pivot means and terminating at the second sprocket 86 mounted above and slightly beyond the pivot means. More particularly, the disposition of this first flight 81a of the chain can be described as defining the chord of an arc centered at the pivot means 70 and having a radius equivalent to the width of a tray. The second flight 81b of the chain extends substantially horizontally from the second sprocket 86 to the third sprocket 87 which is disposed at the entrance end of the apparatus substantially vertically above the first sprocket 85. Consequently, the third flight 81c of the chain is substantially a vertical one extending downwardly from the third sprocket 86 to the aforementioned first sprocket 85.

This first sprocket 85 constitutes an idler sprocket mounted on a transverse shaft 91 that is suspended from and is common to the corresponding idler sprockets associated with the other two endless chains. This sprocket 85 is so positioned above the tray stack that a finger 80 carried by the link chain 81 will be caused to engage the edge of the uppermost tray on the stack when properly positioned by the stack elevator 40, previously described.

The second sprocket 86 is the drive sprocket for the link chain 81; and for this purpose, is mounted on a drive shaft 92 that is suspended from a transverse member 93 of the frame and mounts, in common with this drive sprocket, the corresponding drive sprockets of the other two link chains. The drive shaft 92 is caused to rotate by suitable connection to the drive mechanism for the pivot means 70 (not shown). The speed is such that the advance of the finger 80 carried by the link chain 81 and the rotation of the pivot rollers 72, 73, 74 are properly correlated. As will be apparent, the drive shaft 92 rotates so as to effect a clockwise movement of the link chain 81 about its three supporting sprockets 85, 86, 87, as viewed in FIG. 4. Since the chain 81 is driven at a predetermined speed, and since its overall length is also predetermined, a second finger 80' is mounted on the same chain in predetermined, spaced relation to the first finger 80 so that the trays may be inverted in succession with a desired time and space interval therebetween. The construction of this second finger 80' is, as will be apparent from the drawing, identical with that of the first finger.

The third sprocket 87, like the first, is an idler sprocket; but is mounted for displacement from its normal position, as shown in FIG. 4, such permitted motion of the sprocket enabling the link chain 81 and the fingers 80, 80' carried thereby to be displaced from the illustrated rectilinear path which they traverse between each pair of the sprockets 85, 86, 87. To enable such displacement of the third sprocket 87, it is mounted on an arm 95 which is pivotally supported on the upper frame by a transversely extending rigid bar 96. A torsion spring 97 is connected between the arm 95 and the rigid bar 96 so as to constantly urge the arm and the sprocket 87 carried thereby in a clockwise direction, as viewed in FIG. 4. As a consequence, such urgency of the spring 97 effects a constant tensioning of the link chain 81 mounted on the sprockets 85, 86, 87, but enables the chain to be displaced from its rectilinear flight at various points in its overall length. If the link chain 81 is displaced, for example, in the course of its first flight 81a, the arm 95 may pivot against the action of the torsion spring 97 in a counterclockwise direction to accommodate what amounts to, in effect, an experienced foreshortening of the overall length of the chain. When such displacement of the chain 81 is discontinued, the spring 97 immediately returns the arm 95 and the sprocket 87 carried thereby to the position indicated in the drawing wherefore the chain 81 remains taut and in constant driving engagement with all of the sprockets 85, 86, 87.

In order to drive the inverting mechanism 41 including the link chains 81 as well as the pivot rollers 72, 73, 74, suitable drive connections are made from a motor (not shown) to the second sprocket shaft 92 and the roller shafts 75, 76, 77. To start such motor, a control switch arm 98 is positioned adjacent the described elevator control switch arm 62 for engagement by a rising stack of trays. The switch associated with the arm 98 is connected to the drive motor for the inverting mechanism and is normally open but closes upon engagement by a tray to actuate such drive motor. Once closed, the motor control switch is so maintained by a detent (not shown) on a control lever 98a. This control lever 98a extends between the channel members 46 toward the upper ends thereof so as to be engaged by the carriage of the elevator rising thereagainst after a tray stack has been exhausted. When so engaged, the switch arm 98 is released by the detent on the control lever 98a so as to again open the switch. The structural arrangement is not more precisely described since its details form no part of the invention and other arrangements which place the instigation of the operation of the inverting mechanism under control of the elevator mechanism and the rising stack of trays can obviously be substituted.

If the uppermost tray on a stack has been brought to the proper position by the elevator 40 for inversion by the tray-inverting mechanism 41, and the latter has been energized in the manner described, such inversion occurs in the following manner. With the rollers 72, 73, 74 of the pivot means 70 and the fingers 80 of the tray-gripping means 71 advancing at their predetermined, controlled rates, the fingers 80 will be brought against the edge of the uppermost tray on the stack so that their hooked ends 80a will encompass and thus grip the edge of this uppermost tray. The fingers 80 are moving along an upwardly inclined path, wherefore the tray will be urged against the first roller pair 72 (to the left, as viewed in FIG. 4) and will simultaneously be lifted at its end remote from the rollers 72 away from the next succeeding tray on the stack. Since this uppermost tray is initially in engagement with the tray immediately thereunder, a force will be transmitted frictionally to that succeeding tray tending to move it simultaneously towards the rollers 72. Such motion of the succeeding tray toward the rollers 72 is effectively by spaced stops 99 that are pivoted adjacent the forward ends of the stack in a manner such that their upper free ends are disposed at a level under the uppermost tray of the stack but above the level of the succeeding tray. Thus the uppermost tray can move against the rollers 72 while the succeeding tray remains in its aligned position on the stack until it is subsequently moved into the position of the new departing uppermost tray. When the last (bottom) tray of a stack arrives at the uppermost position preparatory to its inversion, the stops 99 may pivot under such tray and serve as a support therefor as that tray is engaged at its remote edge by the fingers 72 and is pushed toward the pivot rollers 72.

In addition to the described stops 99 for blocking lateral motion of the tray under the uppermost tray when the latter is moved against the rollers 72, means are also provided to preclude this tray immediately beneath the uppermost from being lifted together with the uppermost tray when the latter is engaged and lifted by the fingers 80. It may be stated that such tray-separating means are necessary because some of the fruit juice may lodge upon the ribs of the trays so as to become very sticky and cause an adherence of one tray to another. The tray-separating means, generally indicated at 100, preferably takes the form of a bracket 101 pivotally supporting a transverse shaft 102 adjacent the upper edge of the tray stack, said shaft 102 carrying a pair of spaced stops or dogs 103, 104. The dogs 103, 104 are urged by a tension spring 105 in a counterclockwise direction to a rest position, as illustrated in FIG. 4. When in the illustrated position, the upper dog 103 is in the path of the uppermost tray as it is first lifted by the fingers 80 while the lower dog 104 is positioned slightly to one side of such path. As the lifted tray comes into contact with the upper dog 103, the latter is forced to pivot in a clockwise direction as viewed in FIG. 4 against the action of the spring 105 to thereby bring the lower dog 104 into a position of insertion between the lifted tray and the tray immediately thereunder on the stack. If the second tray stacks to the upper tray and starts to move upwardly therewith, it comes into engagement with the lower dog 104 and is held against further movement with said upper tray; and upon separation therefrom drops back onto the stack. After a predetermined amount of lifting of the uppermost tray, the upper dog 103 is freed from engagement therewith so that the shaft 102 carrying the dogs 103, 104 may now pivot under the action of the tension spring 105 in a counterclockwise direction to its original position, as illustrated in FIG. 4. Lifting of the next tray by the fingers 80 resets the tray-separating means 100 in the manner previously described; and this operation is, of course, repeated as each tray is lifted from the stack.

After the uppermost tray on a stack has been separated from the tray lying immediately thereunder, in the manner just described; it is, after being moved against the first roller pair 72 of the pivot means 70, carried upwardly to substantially a vertical position by the movement of the tray-gripping fingers 80. It will be apparent that after such vertical position has been attained or slightly passed, the tray will tend to fall towards a horizontal position to complete its inversion. Preferably, such a free fall of the tray is to be avoided, since it would permit the tray to return to a horizontal position slightly askew of the desired, aligned position for further conveyance through the remainder of the apparatus.

Consequently, there is provided a tray-engaging means that preferably takes the form of a pair of spaced belts 110 presenting frictional, tray-engaging surfaces and arranged to engage the edge of the tray released by the tray-gripping fingers 80, and to maintain frictional contact therewith while the pivot means 70, previously described, continues its contact with the other edge of each tray during the entire descent thereof from its vertical position to the horizontal position. Each of these belts 110 is trained about a first roller 111, mounted for free rotation on the drive shaft 92 for the link chain 81 so that engagement of the belt with the edge of the tray will be instigated almost immediately after the tray-gripping fingers 80 have lost their engagement therewith. This assures that substantially a continuous force will be exerted against the tray to maintain frictional engagement thereof, at its remote edge, with the pivot means. From this first roller 11, the belt 110 extends along a downwardly inclined flight 110a to the second roller 112 mounted on a level with the described pivot means 70 so that control of the tray will be maintained through its entire cycle of inversion. Like the first flight 81a of the finger-supporting chain 81, this first flight 110a of the belt 110 extends along the chord of an arc centered at the pivot means 70 with a radius equivalent to the width of a tray. The second roller 112 is driven at a speed such that the belt 110 moves linearly at a rate somewhat in excess of that of the tray-gripping fingers 80 that carry the trays from their horizontal to their vertical positions. This drive roller 112 is connected to the mechanism for driving the fingers 80 and pivot rollers 72, 73, 74 so that the speeds are properly correlated. From the drive roller 112, the belt 110 extends along a substantially vertical flight 110b to a third roller 113 which is supported by a spring arm 114 very similar to that which supports the third sprocket 87 for the link chain 81 so as to provide for tensioning of the belt 110 and also to permit displacement thereof during operation of the inverting mechanism, as will be described hereinafter. From this third roller 113, the third flight 110c of the belt 110 extends again to the first roller 111, previously described, to complete its endless traverse. As will be apparent, the belts 110 are driven around the rollers 111, 112, 113 in a clockwise direction, as viewed in FIG. 4.

The inverted trays are received in succession at their ribbed edges on segmented parallel supports or rails 120 constituting elements of a first conveyor 121 that forms part of the aforementioned conveyor means 15 and is adapted to remove each tray so deposited from the vicinity of the tray-inverting mechanism 41 so that a subsequent tray may be received thereon and will thereafter follow its predecessor. As best shown in FIGS. 3 and 4, this conveyor 121 also includes a spaced pair of link chains 122 trained over suitable sprockets 123, 124 so that the upper flight of each link chain extends from a position adjacent the pivot means 70 along a substantially horizontal path which extends entirely over the open upper end of the hopper 13. The rails 120 are disposed adjacent the upper flight of the link chains 122, and the trays are positively propelled therealong by small lugs 125 attached to each of the link chains so as to project inwardly over the adjacent rail. The link chains 122 are driven from the same drive mechanism which provides for movement of the elements of the tray-inverting mechanism 41, so that its motion will be correlated therewith. The propelling lugs 125 are arranged to move relatively rapidly so that one tray will be removed by the conveyor 121 quickly from the vicinity of the tray-inverting mechanism 41 so that the fruit of the subsequent tray, during its inversion, will be free to fall into the hopper 13 and will not fall upon that preceding tray. It may be noted that since this conveyor 121 is arranged to engage the trays only adjacent their edges, the conveyor itself does not interfere with the free fall of the fruit from a tray into the hopper 13. In order to avoid falling of fruit beyond the outer sides of the hopper 13, downwardly converging side plates 126 are preferably attached to the frame 20. These side plates 126 also assure that each tray is guided onto the rails 120.

At a position beyond the tray inverting mechanism 41, but still lying over the fruit receiving hopper 13, a helicoidal fruit scraper 127 is disposed. This helicoidal scraper is supported between the parallel supports for the trays moved by the first conveyor 121 on a transversely-extending shaft 128 that is driven in a suitable manner and is supported by the frame 20 so that the peripheral edges or rims of the helicoidal scraper are adapted to barely contact the under surface of a tray moved by the first conveyor 121 so that any fruit thereon will be dislodged. So that the tray will not be lifted when engaged on its under surface by the helicoidal scraper, a pair of rollers 129 are supported for free rotation in engagement with the upper surface of the trays.

In order to convey more clearly the manner of tray inversion, and at the same time, the relative dispositions of the various elements of the inverter 41 and the associated elevator 40 and first conveyor 121 during such inversion, reference is made to the diagrammatic, operational views shown in FIGS. 6a through 6d. In these four views, a series of trays T1, T2, T3, T4, and T5 appear, each progressing in order through the inverting mechanism 41.

Figure 6A:
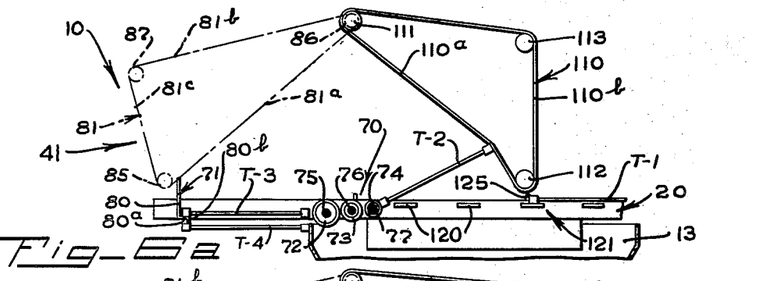
FIGS. 6a, 6b, 6c, and 6d are a series of diagrammatic views of the tray unstacking and dumping arrangements illustrated in detail in FIGS. 1, 3, and 4, and indicating successive positions of a tray as the same is removed from the top of the stack and is thereafter inverted to effect the dumping of the fruit therefrom.

With initial reference to FIG. 6a, the first tray T1 has been inverted and is being moved by the first conveyor 121 away from the inverting mechanism 41. The second tray T2 has almost completed its inversion and is descending onto the conveyor 121 in the space left vacant by the departing first tray, T1. The third tray T3 is resting on the top of the stack of trays and is about ready to commence upward, arcuate movement through the action of the inverting mechanism 41. Trays T4 and T5, of course, are the next succeeding trays on the stack.

As will be apparent from the indicated order of progression of the trays, the conveyor 121 is moving to the right, the belts 110 are moving in a counterclockwise direction, the rollers 72, 73, 74 are turning in a clockwise direction, and the link chain 81 and the fingers 80, 80' carried thereby are moving in a counterclockwise direction, one finger 80 being about to engage the uppermost tray on the stack, that is, tray T3. Since tray T3 has arrived at the position for instigation of the inversion, the stack-elevating mechanism has been de-energized so that tray T3, as well as trays T4 and T5 thereunder are at rest.

With specific reference now to tray T3, the finger 80 carried by the link chain 81 moving in its counterclockwise direction has been brought into engagement with the edge of the tray with the hooked end 80a of the finger having assumed its position of insertion between the bottom of the uppermost tray T3 and the top of the tray T4 thereunder. Since the finger 80 engaged with the uppermost tray T3 is carried by the upwardly inclined flight 81a of the link chain, the finger is moving upwardly and to the right, as viewed in FIG. 6a. As will be apparent, continued motion in this direction will move the tray T3 to the right so that its edge remote from the finger will be brought against the first roller pair 72 of the pivot means 70 for the trays. Tray T4 under the uppermost tray T3, will be blocked from horizontal movement along with tray T3 by the pivoted stops adjacent the first roller pair 72 and from upward movement by the described tray-separating means 100. After such initial movement of tray T3 against the rollers 72, both engaged edges of the tray will start their predetermined movement which ultimately will result in complete inversion. The movement of the link chain 81 and of the first roller pair 72 is correlated so that substantially a radial disposition of the tray will be maintained relative to the axis of the first rollers 72. Thus, the initial radial disposition of tray T3 shown in FIG. 6a will be maintained as the tray moves to its advanced second position illustrated in FIG. 6b. During such upward, arcuate movement of the tray T3 about the first roller pair 72 of the pivot means 70, the tray will be held resiliently between the frictional surface of the first roller pair 72 and the engaging finger 80 on the link chain 81. Such resilient holding or gripping of the tray results first because of the precise disposition of the first flight 81a of the link chain 81 and secondly, because that link chain is supported under tension so that it can be displaced. The disposition of the first flight 81a of the link chain 81 is such that the finger 80 automatically comes into gripping engagement with the edge of a properly positioned uppermost tray on the stack, as illustrated clearly in FIG. 6a. Thereafter, the finger 80 moves along the upwardly inclined path which for a period approaches the first roller pair 72 and then moves further away therefrom, since the link chain 81, in its first flight, defines the chord of an arc centered at the first roller pair 72 and having a diameter equivalent to the width of the tray, as previously described. After the finger 80 has engaged a tray T3, as shown in FIG. 6a, and starts its movement along an upwardly inclined path, it is constrained by the engaged tray T3 to move along an arcuate rather than a rectilinear path. Consequently, as the tray T3 is moved upwardly by the finger 80, the finger itself first is pivoted into a position against the supporting link chain 81, and thereafter the link chain itself is displaced outwardly from its normal rectilinear disposition. Such displacement is clearly shown in FIG. 6b and, of course, is permitted because the third sprocket 87 which supports the link chain 81 is free for displacement against the urgency of the chain-tensioning spring 97.

Figure 6B:
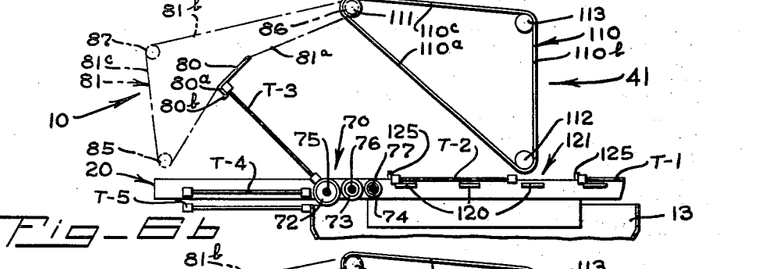
Figure 6C:
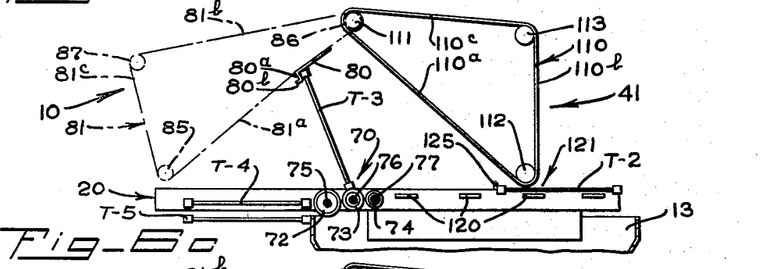
Figure 6D:
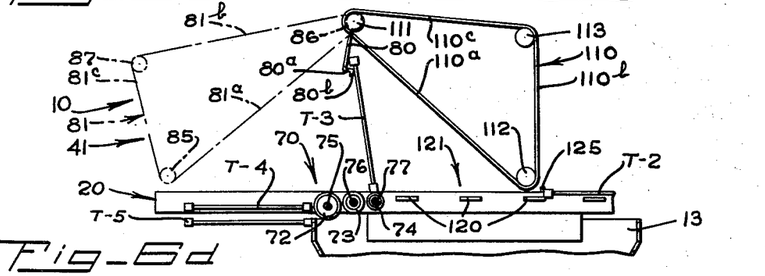

As upward movement of the tray T3 continues so that the tray approaches a vertical disposition, as illustrated in FIG. 6c, one edge of the tray in transferred from the first roller pair 72 to engagement with the second roller pair 73 while continued engagement by the finger 80 at the remote edge is maintained. Thus their resilient gripping engagement of the tray T3 is uninterrupted even during the transition of its support from one roller pair to another. The resilient gripping of the tray T3 is also continued as the one edge of the tray moves from the second roller pair 73 to the third roller pair 74 and the other remote edge is carried by the fingers 80 as it approaches the second sprocket supporting the link chain. However, since at this point the finger 80 is moving along a path that is departing from the pivot means 70, the resilient gripping is lessening. When the vertical position of the tray T3, illustrated in FIG. 6d has been attained, no resilient gripping by the finger 80 exists, and the tray, at this point, is held against the third roller pair 74 merely by its own weight. However, as the resilient engagement of the finger 80 and the tray decreases, the finger 80 swings away from the link chain 81 in a counterclockwise direction and the tail 80b of the finger 80 engages the tray as seen in FIG. 6d to impel it towards the belts 110. When the tray T3 engages the friction belt 110, in the manner illustrated with respect to tray T2 in FIG. 6a, the resilient gripping of the tray between the belt 110 and the third roller pair 74 is established and maintained throughout the entire descent of the tray to the first conveyor 121. Such descent is rapid relative to the previous lifting of the tray T3 since the belt 110 and the roller 74 move more rapidly than the rollers 72 and the fingers 80. Resilient gripping by the belt 110 is very similar to that by the finger 80 on the link chain 81 since the belt is supported under tension in a fashion substantially identical to that supporting the link chain. From the foregoing, it will be clear that during the entire inversion of the tray from its original horizontal position to its final inverted horizontal position, substantially constant resilient engagement is maintained therewith so that the disposition of the tray is under continuous control.

As the tray T3 is carried upwardly from the position illustrated in FIG. 6a toward that illustrated in FIG. 6b, it is removed from engagement with the switch arm 62 to reactivate the elevating mechanism 40. Accordingly, simultaneously with the upward movement of the tray T3 to the position shown in FIG. 6b, tray T4 is moved upwardly with the stack by the tray elevating mechanism 40 until it engages the switch arm 62 released by tray T3 and finally pushes such switch arm upwardly to de-energize the elevator raising mechanism. Tray T4 therefore comes to rest in the position illustrated both in FIGS. 6b and 6c until finally engaged by a succeeding finger 80', and carried upwardly thereby in a fashion similar to that described with respect to tray T3, such upward movement of tray T4 being illustrated in FIG. 6d. As tray T4 is carried upwardly, again the elevating mechanism 40 becomes energized so as to bring the next succeeding tray T5 upwardly into position for gripping by a subsequent finger 80 on the link chain, and the process continues in this manner.

As a given tray, tray T3 for example, is carried to a position wherein it is substantially inclined such as illustrated in FIG. 6c, the fruit thereon will commence to tumble downwardly along the tray and into the hopper 13. Since, as previously mentioned, the roller pairs 72, 73, 74 are staggered in their positions on their supporting shafts 75, 76, 77, no fruit will be caught by such rollers and any which happens to drop onto a roller will be immediately carried thereby around its surface and will then fall therefrom into the hopper 13. Furthermore, no interference will be encountered from the tray previously inverted since, as illustrated clearly in FIG. 6c, a given tray T2 has been carried away from the dumping location before its successor tray T3 has reached an inclination sufficient to instigate the tumbling of the fruit therefrom into the hopper 13. Such non-interference results from the increased speed of the belt 110, which lowers each tray rapidly to the first conveyor 121 and the relatively rapid speed of such first conveyor 121 so that the tray moves quickly from its inverted position over the hopper 13.

Most of the fruit, of course, drops from the tray during its inversion in the manner described. However, a portion of the fruit becomes sticky and therefore clings to the surface of the trays so as to not fall freely therefrom. If any fruit remains on the under surface of the inverted tray after it has been received on the parallel rails 120, it will be consequently scrapped therefrom as the first conveyor 121 moves the tray over the described helicoidal scraper 127.

*Tray Loader 11*

The inverted and cleaned tray is delivered by the first conveyor 121 to a second conveyor 130 that is adapted to conduct a tray to and through the tray loader 11. Since this previously mentioned tray loader 11 in and of itself forms no part of the present invention, reference is made to the aforementioned patent of William L. Gerrans, Pat. No. 2,133,442 for details of its structure and precise manner of operation. However, it is necessary to point out that for the proper operation of this tray-loader 11, the trays must pass therethrough in abutting relationship. To provide for such conveyance of the trays, the second conveyor 130, as shown in FIG. 1, preferably takes the form of a pair of spaced endless belts 131 adapted to engage the edge ribs of each tray delivered thereto by the first conveyor 121. This belt conveyor 130 is driven by suitable mechanism at a speed somewhat less than that of the first conveyor 121 so that a tray positively propelled by the first conveyor may slide over the belts 131 to overtake a preceding tray which is supported entirely on the belts. Thus, trays separated in their advance to permit the dumping of the fruit from succeeding trays without interference by the preceding tray are by the expedient of differential speed conveyors arranged to arrive in abutting relationship as required for proper loading of the fruit thereon.

Trays are loaded with fruit during their conveyance by this second conveyor 130 and are, after being loaded, delivered to another belt conveyor 135 similar to that previously described and arranged to move at a rate correlated with, but slightly in excess of that of the second conveyor. Thus, when a tray arrives on the third conveyor 135, it is moved in an increased speed to draw away from the tray immediately subsequent thereto wherefore the trays are ultimately delivered by the third conveyor to the tray-stacker 12 in spaced relation so that the stacking operation may proceed in the proper fashion as will become apparent hereinafter. Preferably, rollers 136 are supported above the third conveyor 135 to hold the trays in driving engagement therewith.

*Tray Stacker 12*

Figure 7:
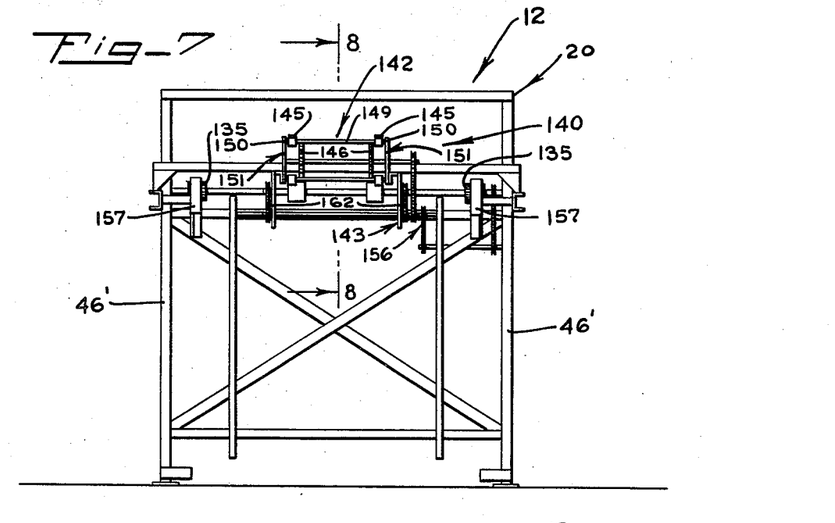
FIG. 7 is an end view of an arrangement for stacking trays, as viewed from the right of the apparatus in FIG. 1.
Figure 8:
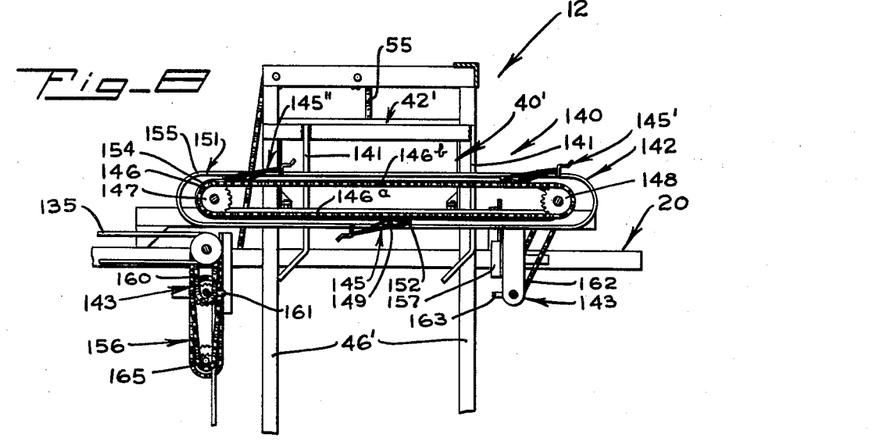
FIG. 8 is a sectional view taken along line 8—8 of FIG. 7, and FIGS. 9a, 9b, 9c and 9d are a series of diagrammatic operational views of the stacking mechanism indicating a tray in successive positions and culminating in its stacked position.

With continued reference to FIG. 1 and additional reference to FIGS. 7 and 8, the tray stacker 12 includes an elevator 40' that is adapted to support a stack of trays and means, generally indicated at 140, for delivering the trays received from the third conveyor 135 successively to the stack supported by that elevator.

The structural details of the elevator 40' itself will not be described since they are substantially identical to those of the first elevator 40 previously described in connection with the tray unstacker and dumper 10. Consequently, identical numerals with an additional prime notation are employed in the drawings to designate parts of the second elevator 40' that correspond to those of the first elevator 40. As previously mentioned during the description of the first elevator 40, it is operatively connected to the second elevator 40'. More particularly, as can best be seen by reference to FIG. 8, the end of the link chain 55 remote from the first elevator 40 is connected to the carriages 42' of the second elevator 40' so that when the first elevator 40 rises one incremental step to bring a tray into position for presentation to the tray inverting mechanism 41, the carriages 42' of the second elevator 40' drop an equal amount to enable reception of a tray delivered from the third conveyor 135 by way of the tray-delivery means 140. When the carriages 42' of the second elevator 40' are in their uppermost position, as illustrated in FIG. 8, the carriages 42 of the first elevator 40 will be in their lowermost position. This uppermost position of the carriages 42' is high enough to enable the carriages 42 of the first elevator 40 to receive a stack of trays from an entering cart. A pair of vertical bars 141 with bent lower ends are attached to the U-channels 46' at each side of the frame 20 so that when the carriages 42' move toward their uppermost positions, the arms 47' thereon are pivoted to one side by engagement with the bar 141 wherefore the carriages 42' may move to such positions without the arms 47' engaging any tray on the tray delivery means 140.

The aforementioned tray delivery means 140 includes a transfer mechanism 142 that is adapted to receive the trays from the third conveyor 135 and transfer their path of movement from a horizontal direction to a vertical one directed downwardly. In order to control the vertical descent of the trays onto the stack previously formed on the second elevator 40', a vertical conveyor mechanism 143 is preferably employed.

The transfer mechanism 142 includes a pair of laterally-spaced fingers 145 that are arranged for movement in alignment with a tray moved by the third conveyor 135 so as to receive and support the projecting, forward end of the tray during its movement beyond the end of the conveyor. Each finger 145 is movably supported by structures of a similar nature so that the movable support for only one finger will be described, the other being identified in the drawing by like reference numerals. As shown best in FIG. 8, the finger 145 is supported from a link chain 146 which is trained about spaced sprockets 147, 148 so as to move in a counterclockwise direction with the lower flight 146a of the chain moving in horizontal alignment with and in the same direction as the third conveyor 135 so that the finger 145 supported thereby is properly positioned to receive the forward, protruding edge of a tray carried by such conveyor. More particularly, the finger 145 is pivotally mounted intermediately of its length on a transverse bar 149. Adjacent the finger 145, the bar 149 is welded or otherwise secured to the link chain 146. Preferably, as shown best in FIG. 7, the bar 149 is elongated so as to be similarly secured to the other link chain 146 and also mounts the laterally-spaced finger 145 so that the fingers are constrained to move in unison. Each end of the bar 149 projects beyond the finger 145 and mounts a roller 150 that is adapted to move along a cam track 151 which conforms generally in configuration to the link chain 146 as trained about the spaced sprockets 147, 148. This cam track 151 is also engaged by a cam roller 152 on the end of a short pin 153 which is fixedly mounted on the end of the finger 145 remote from its tray-engaging end. The cam track 151 consists of inner and outer rigid metal straps 154, 155, the inner strap 154 having a configuration corresponding very closely to that of the link chain 146 while the outer strap 155 surrounds this inner strap in predetermined spaced relation thereto. In the sections of the cam track 151 which parallel the upper and lower flights 146a, 146b of the link chain, the two straps 154, 155 are closely spaced so as to encompass the rollers 150, 152 quite closely therebetween and maintain the finger 145 supported from the bar 149 and pin 153 that mount such rollers in a predetermined disposition, as illustrated clearly in FIG. 8. However, at its ends, the outer strap 155 is disposed further away from the inner strap 154 so that the spacing therebetween is widened and the finger 145 is therefore permitted to pivot about the bar 149.

With continued reference to FIG. 8, it will be seen that additional fingers 145', 145", are mounted on the link chain 146 at spaced intervals in its length and are arranged to similarly make engagement with the cam track 151 so that their dispositions are controlled throughout their endless cycle. The spacing of the fingers 145, 145' and 145" on the chain 146 will, of course, be determined by the speed of the chain and the rate of arrival and dimensions of the trays delivered thereto by the third conveyor 135. So that the rate of movement of the fingers 145 will be correlated with that of the third conveyor 135, the link chain 146 is connected by a suitable linkage indicated at 156 to the drive for the third conveyor 135. The connection is such that the movement of the fingers 145 along the extension of the path of the third conveyor 135 is at a slightly reduced rate relative to that of the third conveyor. Therefore the projecting forward end of the tray moved by the third conveyor 135 will overtake a finger 145 moving in advance thereof on the link chain 146. By this variation in speeds of the third conveyor 135 and the fingers 145, slight variations in tray dimensions can be accommodated without interference with the proper operation of the entire mechanism.

Alternatively, the illustrated drive connection between the third conveyor 135 and the transfer mechanism 142 can be eliminated and the drive for the latter can be obtained through the medium of the trays themselves. Thus a tray driven by the third conveyor 135 would engage the fingers 145 to instigate their motion. Regardless of the manner of drive connection, the aforementioned accommodation of variances in tray dimensions will still exist.

After the forward end of a tray has engaged and is supported by the fingers 145 on the link chain 146, the tray continues its movement with this forward end supported by the fingers 145 while its rearward end remains supported by the third conveyor 135. However, at the same time that the rearward end of the tray is about to leave the third conveyor 135, the forward end is also released by the fingers 145 since each finger, at this point, reaches the spaced, curved end portion of the cam track 151 so that it may pivot from its illustrated position in FIG. 8 in a counterclockwise direction, and thus be removed from engaging relationship with the forward end of the tray. Thus, simultaneously, the forward and rearward ends of the tray are released, and the tray is freed for downward movement. To preclude further forward horizontal movement of the tray, rigid stops 157 are fixed to the frame 20.

As previously mentioned, the descent of each tray released by the transfer mechanism 142 is controlled by a vertical conveyor 143. Preferably, as illustrated, such vertical conveyor 143 takes the form of a pair of link chains 160 suspended adjacent the discharge end of the third conveyor 135 so that lugs or fingers 161 pivoted thereon will be moved downwardly just beyond the end of the belts of the third conveyor 135; and an additional pair of link chains 162 supporting similar lugs or fingers 163 for movement along a downward path in a position slightly less than one tray width away from the end of the third conveyor. Each of the described link chains 160, 162 is endless, being trained about vertically-spaced sprockets 164, 165 which are suitably driven by appropriate connection to the transfer mechanism 142 and the third conveyor 135 so that the movement of all these units will be properly correlated. As shown in FIG. 8, the movement of the link chains 160 adjacent the end of the conveyor 135 will be in a clockwise direction, while the link chains 162 of the vertical conveyor 143 lying remote from the third conveyor will move around the sprockets 164, 165 in a counterclockwise direction. Thus, the facing lugs 161, 163 on the spaced link chains 160, 162 will move downwardly together and, as shown, their position on the link chain is such that they are always at substantially the same horizontal level to provide even support for a tray deposited by the transfer mechanism thereon. The lugs 161, 163 pivot to a horizontally-projecting disposition during the described downward movement, being held at such position by engagement with the link chains 160 or 162, respectively, but pivot inwardly against the chains on their upward return flight.

Figure 9A:
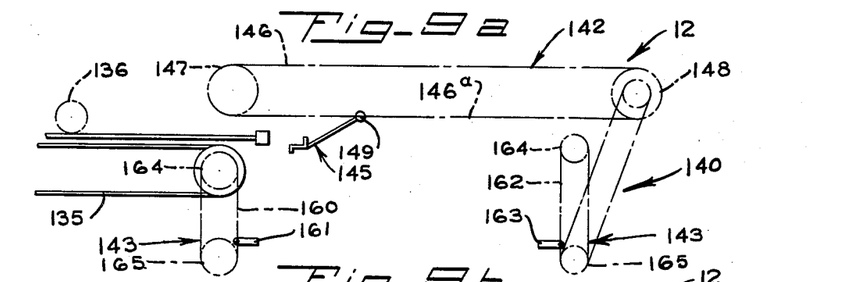
Figure 9B:
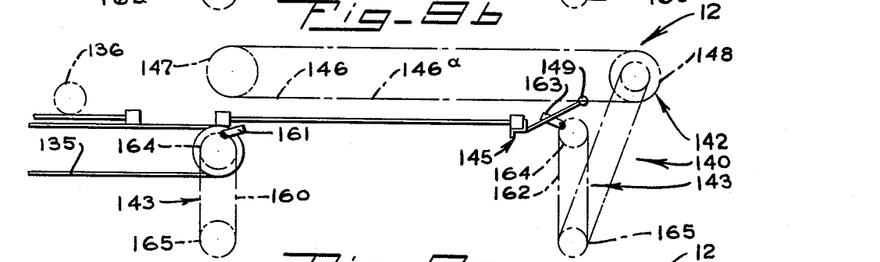
Figure 9C:
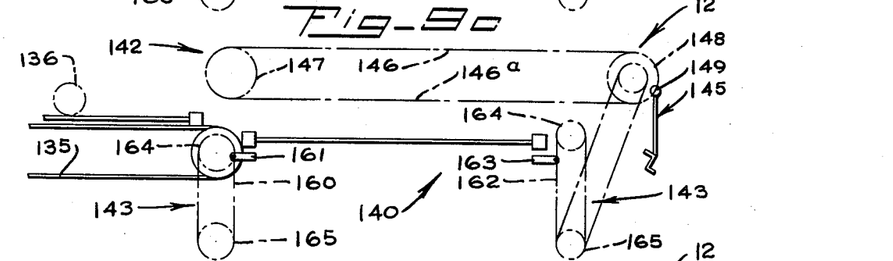
Figure 9D:
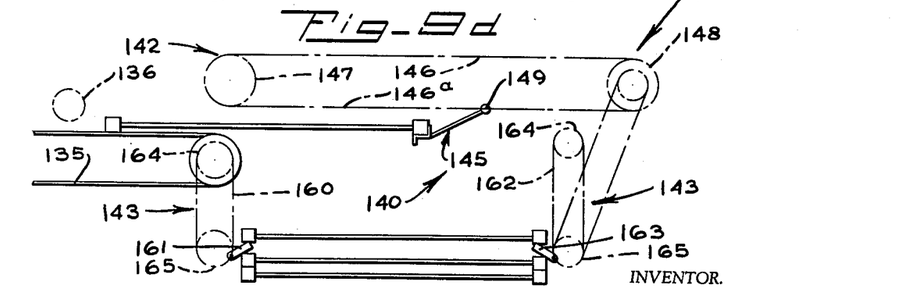

For a clearer understanding of the operation of the transfer mechanism 142 and the vertical conveyor 143 associated therewith, reference is made to FIGS. 9a through 9d where the transfer of an individual tray from the third conveyor 135 to a stack of trays supported by the elevator 40' of the tray stacker is shown in successive operational stages. With initial reference to FIG. 9a, a tray is being moved by the third conveyor 135 toward supporting engagement with the fingers 145 of the transfer mechanism 142 and is continuing to move to the right. A preceding tray is being lowered simultaneously by the vertical conveyor 143 toward the stack of trays thereunder. Since the third conveyor 135 moves to the right faster than the fingers 145, the third conveyor overtakes the fingers and comes into supporting engagement therewith, as shown in FIG. 9b. Thereafter, the tray moves at the rate of finger movement, and slips relative to the belts of the third conveyor 135. As the tray carried by the fingers 145 and the belt conveyor 135 continues to move to the right, the lugs 161, 163 of the vertical conveyor 143 approach supporting position as the tray is about to be released from its support at one end by the fingers 145 of the transfer mechanism 142 and at the other end by the conveyor 135. Shortly thereafter, such release is effected; the fingers 145 of the transfer mechanism 142 pivot in a counterclockwise direction away from tray-supporting position under their own weight as permitted by the widened spacing of the cam track 151, while the other end of the tray merely moves off the end of the third conveyor 135, as shown in FIG. 6c. The lugs 161, 163 of the vertical conveyor 143 are in tray-receiving position, and gently receive the released tray. The transition from the transfer mechanism 142 to the vertical conveyor 143 is thus performed smoothly and with substantially no jarring of the loaded tray. From the position shown in FIG. 6c, the tray moves down slowly on the vertical conveyor 143 to the end thereof whereat the lugs 161, 163 are engaged by the uppermost tray on the stack so as to be pivoted from their supporting relationship with the tray as shown in FIG. 9d. The tray is left on the top of the stack while the lugs 161, 163 continue down and around the sprockets 165. The elevator 40' which supports the stack is disposed so that the described action occurs and that, again, the transition from the vertical conveyor 143 to the stack of trays is a gentle one wherefore no fruit is jarred from the surface of the trays.

As in the case of the tray stacker and dumper 10, previously described, it will be noted that the tray is positively under the control of the mechanism through its entire passage through the tray stacker 12. It will also be observed that the speeds of the inverting mechanism 41, the three conveyors 121, 131, 135, and the tray-delivery means 140 are correlated by connection to a single drive source while the motion of the two elevators is also coordinated by direct connection. Such continuous coordinated control allows the gentleness of handling mentioned above and also precludes any misalignment of the trays during their passage through the mechanism so that jamming or other similar difficulties are almost entirely avoided even though the rate of tray movement is very rapid through the entire apparatus.

Various modifications and/or alterations in the described structure can obviously be made without departing from the spirit of the invention. Furthermore, the described structure can be utilized in ways differing from the indicated operation; for example, stacked empty trays can be brought to the described apparatus and therein unstacked, loaded, and again stacked, the dumping being eliminated. Consequently, the described structure and manner of its use is to be considered as purely exemplary and not in a limiting sense, reference being made to the appended claim which indicates the scope of the invention.

What is claimed is:

An arrangement for inverting a flat generally rectangular tray which comprises pivot means, tray-gripping means movable along an upwardly inclined path so as to urge a horizontally-presented tray edgewise against said pivot means and carry the tray about said pivot means to substantially a vertical position, and tray-engaging means movable along a downwardly inclined path at a greater speed than that of said tray-gripping means and adapted to hold the tray against said pivot means and carry the tray in a controlled descent from a vertical to an inverted, horizontal position.

(References on following page)

References Cited in the file of this patent

UNITED STATES PATENTS

| | | |
|---|---|---|
| 584,818 | Fleckenstein | June 22, 1897 |
| 1,689,332 | Eaton | Oct. 30, 1928 |
| 1,907,458 | Stevenson | May 9, 1933 |
| 2,184,905 | Brintnall | Dec. 26, 1939 |
| 2,342,014 | Schanstra | Feb. 15, 1944 |
| 2,407,782 | Hardy | Sept. 17, 1946 |
| 2,424,252 | Orlando | July 22, 1947 |
| 2,508,368 | Borkmann | May 23, 1950 |
| 2,517,956 | Albertoli | Aug. 8, 1950 |
| 2,540,766 | Stilwell et al. | Feb. 6, 1951 |
| 2,578,603 | Rothman | Dec. 11, 1951 |
| 2,612,277 | Verrinder | Sept. 30, 1952 |
| 2,625,284 | Atwood | Jan. 13, 1953 |
| 2,713,430 | Verrinder | July 19, 1955 |
| 2,716,500 | Criger | Aug. 30, 1955 |
| 2,765,931 | Kraus et al. | Oct. 9, 1956 |